(12) United States Patent
Iyoda et al.

(10) Patent No.: US 9,688,182 B2
(45) Date of Patent: Jun. 27, 2017

(54) VEHICLE LAMP

(71) Applicant: KOITO MANUFACTURING CO., LTD., Tokyo (JP)

(72) Inventors: Haruhiko Iyoda, Shizuoka (JP); Masaya Shido, Shizuoka (JP); Toru Ito, Shizuoka (JP); Yukihiro Onoda, Shizuoka (JP)

(73) Assignee: KOITO MANUFACTURING CO., LTD., Tokyo (JP)

(*) Notice: Subject to any disclaimer, the term of this patent is extended or adjusted under 35 U.S.C. 154(b) by 69 days.

(21) Appl. No.: 14/675,801

(22) Filed: Apr. 1, 2015

(65) Prior Publication Data
US 2015/0274064 A1 Oct. 1, 2015

(30) Foreign Application Priority Data

Apr. 1, 2014 (JP) .................. 2014-075511

(51) Int. Cl.
*B60Q 1/00* (2006.01)
*F21S 8/10* (2006.01)
*F21Y 105/00* (2016.01)
*F21Y 115/20* (2016.01)
*F21Y 115/15* (2016.01)

(52) U.S. Cl.
CPC ......... *B60Q 1/0088* (2013.01); *B60Q 1/0005* (2013.01); *F21S 48/212* (2013.01); *F21S 48/217* (2013.01); *F21Y 2105/00* (2013.01); *F21Y 2115/15* (2016.08); *F21Y 2115/20* (2016.08)

(58) Field of Classification Search
CPC .. B60Q 3/0283; B60Q 2400/10; F21S 48/217
See application file for complete search history.

(56) References Cited

U.S. PATENT DOCUMENTS

| | | | |
|---|---|---|---|
| 2013/0027959 A1* | 1/2013 | Sanchez | F21S 48/1163 362/516 |
| 2014/0056020 A1* | 2/2014 | Bungenstock | F21S 48/115 362/549 |
| 2014/0286034 A1* | 9/2014 | Yamada | F21S 48/217 362/518 |

FOREIGN PATENT DOCUMENTS

| | | |
|---|---|---|
| CN | 103629613 A | 3/2014 |
| JP | 2011-150887 A | 8/2011 |

OTHER PUBLICATIONS

Office Action in counterpart Chinese Patent Application No. 201510150127.6 issued Nov. 8, 2016 (13 pages).

* cited by examiner

*Primary Examiner* — Sean Gramling
(74) *Attorney, Agent, or Firm* — Osha Liang LLP (57) ABSTRACT

A vehicle lamp includes a lamp housing having an opening and a cover attached to the lamp housing and closing the opening to form a lamp chamber, and a lamp unit disposed in an interior of the lamp chamber and including a light source having a plurality of planar light emitting bodies. An outer peripheral portion of each of the planar light emitting bodies is a non-light emitting region, and a portion inside the non-light emitting region of each of the planar light emitting bodies is a light emitting region. At least a portion of the non-light emitting region is formed to be transparent. The transparent portion of the non-light emitting region of the planar light emitting bodies and an outer end portion of the light emitting region of other planar light emitting bodies are superimposed to each other in a thickness direction of the planar light emitting bodies.

5 Claims, 4 Drawing Sheets

VEHICLE LAMP

CROSS-REFERENCE TO RELATED APPLICATION

The present application claims priority from Japanese Patent Application No. 2014-075511 filed on Apr. 1, 2014, the entire content of which is incorporated herein by reference.

BACKGROUND

Technical Field

The present disclosure relates to a vehicle lamp in which a plurality of planar light-emitting bodies is used as a light source.

[Prior Art Literature]
[Patent Document]
Patent Document 1: Japanese Patent Laid-Open Publication No. 2011-150887

Related Art

In a vehicle lamp, as a light source, a plurality of flat planar light emitting bodies is arranged in an interior of a lamp chamber that is configured by a cover and a lamp housing. For example, the flat planar light emitting bodies have an organic EL (Electro Luminescence) layer that is self-luminous.

In the vehicle lamp using the flat planar light emitting bodies thus configured as a light source, a large planar light emitting body is often used in order to secure a large light emitting region.

However, in the case of using the large planar light emitting body, from the probability of occurrence of defects in a panel, the yield is decreased or it is difficult to secure the uniformity of brightness as the light emitting area is increased. Accordingly, there is a possibility that the brightness unevenness is increased.

Therefore, a vehicle lamp using the flat planar light emitting body as a light source has been known in which a plurality of planar light emitting bodies is arranged side by side at predetermined positions, respectively (e.g., see Patent Document 1). By arranging a plurality of planar light emitting bodies with a small light emitting area side by side in this way, the yield is improved and the uniformity of brightness is improved. Further, it is possible to secure a large light emitting area as a whole light source.

However, the planar light emitting bodies require a sealing layer (protective layer) for sealing a light emitting layer (light emitting region) and an outer peripheral portion of the sealing layer is located on the outside of an outer periphery of the light emitting layer. Further, auxiliary electrodes are provided in an outer peripheral portion of the planar light emitting bodies. The auxiliary electrodes are adapted to supply power to the light emitting layer. Accordingly, the outer peripheral portion of the planar light emitting bodies becomes a non-light emitting region from which light is not emitted.

Accordingly, when a plurality of planar light emitting bodies is arranged side by side as in the vehicle lamp disclosed in Patent Document 1, the non-light emitting region is located between the light emitting regions of the plurality of planar light emitting bodies. Therefore, dark portions are formed in the light emitting range (irradiation range) by an amount of presence of the non-light emitting region and thus the unevenness of light does occur or reduction in visibility due to the formation of the dark portions is caused. Particularly, when a plurality of planar light emitting bodies is arranged side by side, it is desirable to secure visibility similar to the case where light is emitted from a single large panel.

SUMMARY

Exemplary embodiments of the invention provide a vehicle lamp which can reduce the generation of light unevenness by suppressing the occurrence of dark portions in the light emitting range.

A vehicle lamp according to an exemplary embodiment, comprises:

a lamp housing having an opening at least at one side and a cover attached to the lamp housing and closing the opening to form a lamp chamber; and a lamp unit disposed in an interior of the lamp chamber and including a light source having a plurality of planar light emitting bodies, wherein an outer peripheral portion of each of the planar light emitting bodies is a non-light emitting region, and a portion inside the non-light emitting region of each of the planar light emitting bodies is a light emitting region, at least a portion of the non-light emitting region is formed to be transparent, and the transparent portion of the non-light emitting region of the planar light emitting bodies and an outer end portion of the light emitting region of other planar light emitting bodies are superimposed to each other in a thickness direction of the planar light emitting bodies.

In this way, the light emitted from the light emitting region superimposed to the transparent non-light emitting region is irradiated to the outside through the non-light emitting region superimposed.

The plurality of planar light emitting bodies may be held in a frame.

In this way, there is no need to hold each of the plurality of planar light emitting bodies in a separate manner.

At least a portion of an outer peripheral portion of the frame may be folded-back relative to other portions thereof and provided as a holding portion configured to hold the outer end portion of the plurality of planar light emitting bodies, and wirings may be arranged in the interior of the holding portion and adapted to supply power to the plurality of planar light emitting bodies.

In this way, an internal space of the holding portion is utilized as a wiring arrangement space.

The plurality of planar light emitting bodies may be sealed by a sealing film.

In this way, the planar light emitting bodies are sealed by the sealing film in a state where portions thereof are superimposed to each other.

The vehicle lamp may further comprise:

a flexible printed wiring board is provided on which the plurality of planar light emitting bodies is arranged, wherein a wiring circuit of the flexible printed wiring board is located to face the plurality of planar light emitting bodies, an anisotropic conductive film is bonded to the wiring circuit, and power is supplied to the plurality of planar light emitting bodies through the anisotropic conductive film from the wiring circuit.

In this way, the flexible printed wiring board has a function of holding the planar light emitting bodies and a function of supplying power to the planar light emitting bodies.

According to the present invention, the light emitted from the light emitting region superimposed to the transparent non-light emitting region is irradiated to the outside through the non-light emitting region superimposed. As a result, occurrence of dark portions in the light emitting range can be prevented, so that it is possible to reduce the generation of light unevenness.

DETAILED DESCRIPTION

Hereinafter, exemplary embodiments for carrying out a vehicle lamp of the present invention will be described with reference to the accompanying drawings.

Meanwhile, the present invention can be applied to various vehicle lamps. For example, the present invention can be widely applied to various vehicle lamps such as a head lamp, a tail lamp, a clearance lamp, a turn signal lamp, a stop lamp, a daytime running lamp, a cornering lamp, a hazard lamp, a position lamp, a back lamp, a fog lamp, or combination lamp thereof.

In the following description, a front-rear direction, an up-down direction and a left-right direction are described while referring to a light emitting direction as a front side. The front-rear direction, the up-down direction and the left-right direction, which are described below, are defined for convenience of explanation. The practice of the present invention is not limited to these directions.

A vehicle lamp 1 is respectively attached and arranged at both left and right ends of a vehicle body. The vehicle lamp 1 includes a lamp housing 2 having a recess opened rearward and a cover 3 closing an opening of the lamp housing 2 (see FIG. 1). A lamp chamber 4 is configured by the lamp housing 2 and the cover 3. An inner space of the lamp chamber 4 is formed as a lamp chamber 5.

Figure 1:
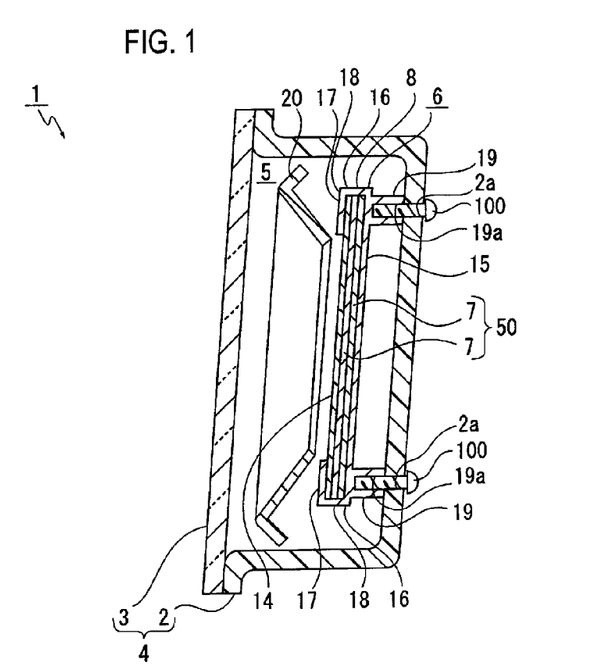
FIG. 1 is a schematic sectional view showing an exemplary embodiment of a vehicle lamp of the present invention, together with FIG. 2 to FIG. 8.

The lamp housing 2 is formed with screw insertion holes 2a, 2a, . . . penetrating in the front-rear direction. The screw insertion holes 2a, 2a, . . . are spaced apart from each other in the front-rear direction and the left-right direction.

Figure 2:
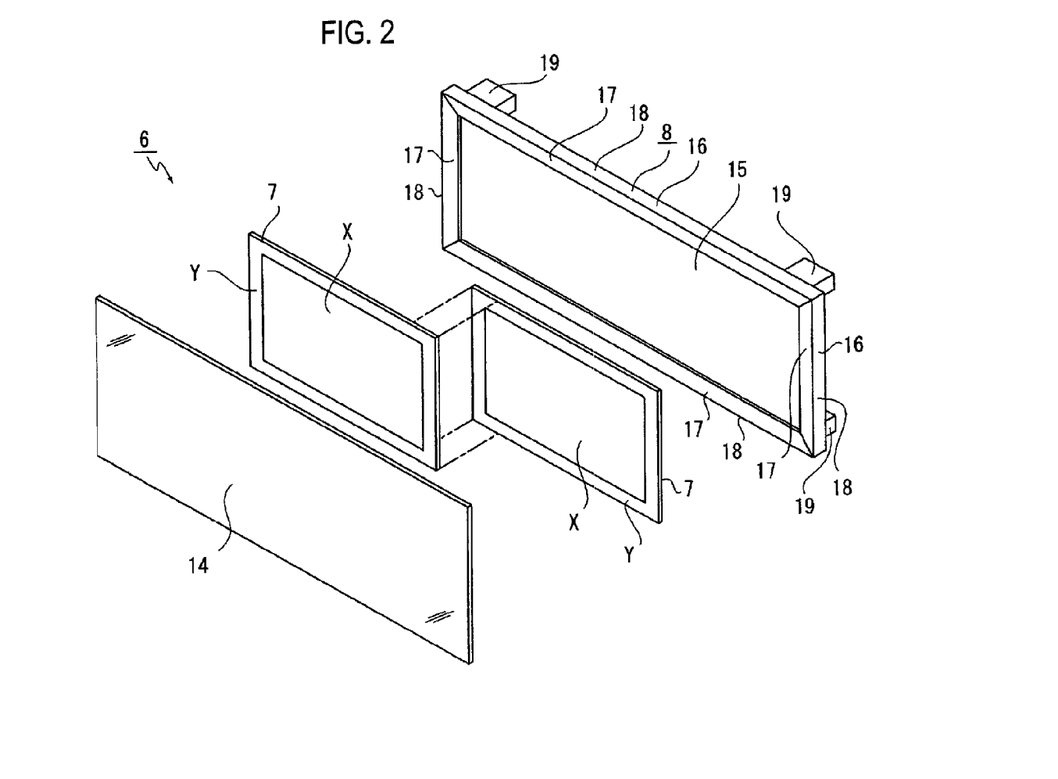
FIG. 2 is an exploded perspective view of a lamp unit.

A lamp unit 6 is disposed in the lamp chamber 5 (see FIG. 1 and FIG. 2). The lamp unit 6 includes planar light emitting bodies 7, 7 and a frame 8 for holding the planar light emitting bodies 7, 7. A light source 50 is configured by the planar light emitting bodies 7, 7.

For example, the planar light emitting bodies 7, 7 can employ a flat planar light emitting body having an organic EL (Electro Luminescence) layer that is self-luminous. Here, the number of the planar light emitting body 7 is not limited to two, but may be three or more.

Figure 3:
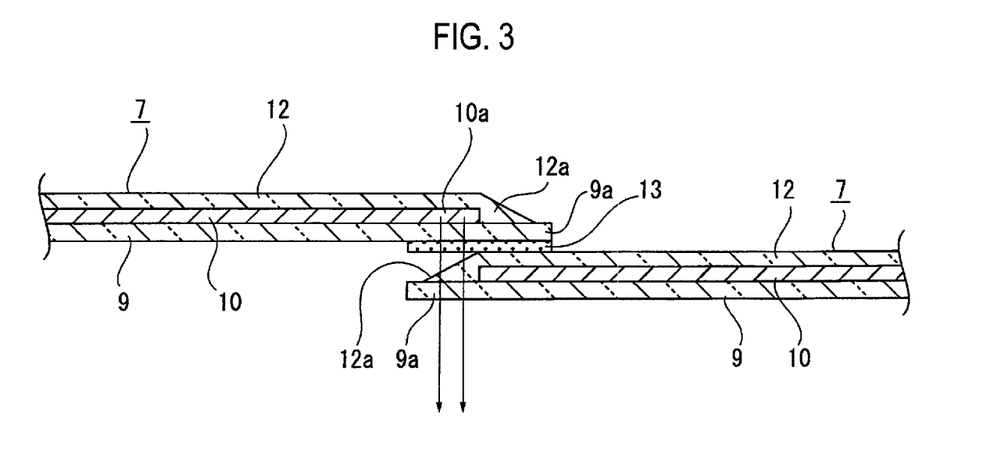
FIG. 3 is an enlarged sectional view showing planar light emitting bodies which have one ends superimposed to each other.

The planar light emitting bodies 7, 7 are held in the frame 8 in a state where portions thereof are superimposed to each other, for example, in a state where one ends thereof in the left-right direction are superimposed to each other in a thickness direction (see FIG. 3).

For example, each of the planar light emitting bodies 7, 7 includes a base layer 9 and a light emitting layer 10. The base layer 9 is a glass substrate that has a horizontally long rectangular shape. The light emitting layer 10 is laminated on a portion other than an outer peripheral portion 9a of the base layer 9. Out of the planar light emitting body 7, a region where the light emitting layer 10 is present is referred as a light emitting region X that emits light, and an outer peripheral portion 9a that is a portion outside the light emitting layer 10 is referred as a non-light emitting region Y that does not emit light (see FIG. 4.).

Figure 4:
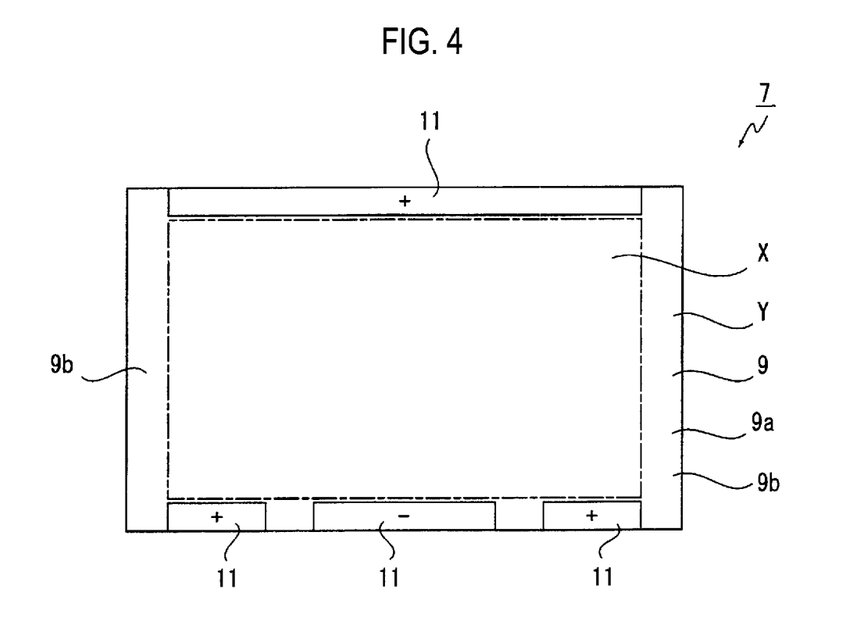
FIG. 4 is a schematic rear view of the planar light emitting body.

Auxiliary electrodes 11, 11, . . . are formed at portions of the non-light emitting region Y including the outer peripheral portion 9a of the base layer 9. For example, the auxiliary electrodes 11, 11, . . . are formed at both upper and lower ends of the base layer 9. The auxiliary electrode 11 on the plus side is formed at one end of the both upper and lower ends. The auxiliary electrodes 11 on the plus side and the minus side are spaced apart in the left-right direction at the other end of the both upper and lower ends. Accordingly, the auxiliary electrodes 11 are not formed at both left and right ends 9b, 9b of the base layer 9. The both left and right ends 9b, 9b of the base layer 9 are formed as transparent portions.

The light emitting layer 10 is sealed by a sealing layer 12 formed by a transparent resin or glass (see FIG. 3). The sealing layer 12 is adapted to cover a front surface of the light emitting layer 10 and an outer peripheral surface of the light emitting layer 10. The sealing layer 12 has an outer peripheral portion 12a located at the non-light emitting region Y.

Respective one ends in the left-right direction of the planar light emitting bodies 7, 7 are superimposed to each other in the thickness direction. That is, a transparent portion (one end portion in the left-right direction) of the non-light emitting region Y of one planar light emitting body 7 is superimposed in the front-rear direction to an outer end portion of the light emitting region X of the other planar light emitting body 7. The superimposed portions are bonded by, for example, a transparent double-sided tape 13 or a transparent adhesive (not shown).

Since the superimposed portions of the planar light emitting bodies 7, 7 are bonded by the double-sided tape 13 or the adhesive, the warpage or separation of the superimposed portions of the planar light emitting bodies 7, 7 is prevented. Further, since the separation of the superimposed portions of the planar light emitting bodies 7, 7 is prevented, the superimposed portions are inconspicuous and therefore the entire of the planar light emitting bodies 7, 7 can be easily seen as being integrally formed by one panel. As a result, it is possible to improve the design of the vehicle lamp 1.

The light emitted from an end portion 10a of the light emitting layer 10 of the planar light emitting body 7 located at a rear side in the superimposed state is transmitted through the double-sided tape 13 or the adhesive. Then, the light is transmitted through the superimposed portion of the non-light emitting region Y of the planar light emitting body 7 located at a front side in the superimposed state, so that the light is irradiated toward the front.

In a state where the one ends of the planar light emitting bodies 7, 7 are superimposed to each other, the planar light emitting bodies 7, 7 are covered by a transparent cover 14 from the front (see FIG. 1 and FIG. 2). The transparent cover 14 is formed of a resin or glass.

The frame 8 has a base surface portion 15, side surface portions 16, 16, . . . , and folded surface portions 17, 17, . . . . The base surface portion 15 has a horizontally long rectangular shape facing the front-rear direction. The side surface portions 16, 16, . . . are protruded forward from an outer peripheral edge of the base surface portion 15. The folded surface portions 17, 17, . . . are protruded in a mutually approaching direction (inward) from a front end edge of the side surface portions 16, 16, . . . . The frame 8 is formed with holding portions 18, 18, . . . having a U-shaped cross-section. The holding portions 18, 18, . . . are formed by an outer peripheral portion of the base surface portion 15, the side surface portions 16, 16, . . . and the folded surface portions 17, 17, . . . .

The frame 8 is provided with coupling protrusions 19, 19, . . . that are protruded rearward from four corners of the base surface portion 15, respectively. Screw holes 19a opened rearward are formed in the coupling protrusions 19.

The planar light emitting bodies 7, 7 are held together with the transparent cover 14 by the holding portions 18, 18, . . . of the frame 8 in a state where the planar light emitting bodies are covered by the transparent cover 14 having the horizontally long rectangular shape from the front. At this time, an outer peripheral portion of the light source 50 and an outer peripheral portion of the transparent cover 14 are held by the folded surface portions 17, 17, . . . and an outer peripheral portion of the base surface portion 15 in a state of being sandwiched therebetween from the front and rear. Further, the planar light emitting bodies 7, 7 (light source 50) and the transparent cover 14 are held in the frame 8. In this way, the lamp unit 6 is configured.

Since the planar light emitting bodies 7, 7 are covered by the transparent cover 14 from the front, the superimposed portions of the planar light emitting bodies 7, 7 are not noticeable and therefore the entire of the planar light emitting bodies 7, 7 can be easily seen as being integrally formed by one panel. As a result, it is possible to improve the design of the vehicle lamp 1.

Mounting screws 100, 100, . . . are respectively inserted through the screw insertion holes 2a, 2a, . . . of the lamp housing 2 and screwed to screw holes 19a, 19a, . . . of the frame 8, so that the lamp unit 6 is mounted to the lamp housing 2.

In this way, in the vehicle lamp 1, the coupling protrusions 19, 19, . . . are provided in the frame 8. Accordingly, it is possible to easily mount the lamp unit 6 to the lamp housing 2.

As described above, the planar light emitting bodies 7, 7 where one ends thereof are superimposed to each other are held in the frame 8. Accordingly, there is no need to hold each of the planar light emitting bodies 7, 7 in a separate manner. As a result, it is possible to achieve the reduction in the number of parts and the simplification of the structure.

Further, since the planar light emitting bodies 7, 7 where one ends thereof are superimposed to each other are held in the frame 8, both ends of the superimposed portions of the planar light emitting bodies 7, 7 are held by the holding portions 18, 18, . . . . Accordingly, the warpage or separation of the superimposed portions of the planar light emitting bodies 7, 7 is prevented, so that it can be omitted to bond the superimposed portions by the double-sided tape 13 or the adhesive.

Therefore, the bonding of the superimposed portions by the double-sided tape 13 or the adhesive can be omitted, so that it is possible to simplify a process of mounting the lamp unit 6. In addition, since the double-sided tape 13 or the adhesive is not required, material cost is saved. As a result, it is possible to reduce the cost of manufacturing the vehicle lamp 1.

Meanwhile, holes of the frame 8 may be formed at portions other than the outer peripheral portion of the base surface portion 15, so that the base surface portion 15 may have a frame shape. When the base surface portion 15 has a frame shape, the color assigned to the frame 8 is hardly visible from the outside of the vehicle lamp 1 through the planar light emitting bodies 7, 7. Accordingly, it is possible to improve the design of the vehicle lamp 1.

Further, the frame 8 may have a curved shape. In the case where the frame 8 has a curved shape, the planar light emitting bodies 7, 7 have, as a whole, a curved shape so as to follow the shape of the frame 8. Accordingly, the light emitted from the light emitting layers 10, 10 can be irradiated toward a desired direction and the lamp unit 6 can be arranged in accordance with an arrangement space of the lamp chamber 5. As a result, it is possible to improve a degree of freedom in design.

Further, in the vehicle lamp 1, wirings (not shown) for supplying power to the auxiliary electrodes 11, 11, . . . of the planar light emitting bodies 7, 7 may be arranged in the interior of the holding portions 18, 18, . . . of the frame 8. The wirings are connected to a power supply circuit (control circuit; not shown)

Since the wirings are arranged in the interior of the holding portions 18, 18, . . . , the internal space of the holding portions 18, 18, . . . is effectively utilized as a wiring arrangement space. Accordingly, a stable holding state of the planar light emitting bodies 7, 7 can be achieved, so that the size of the vehicle lamp 1 can be reduced in accordance with the size reduction of the lamp unit 6.

Figure 5:
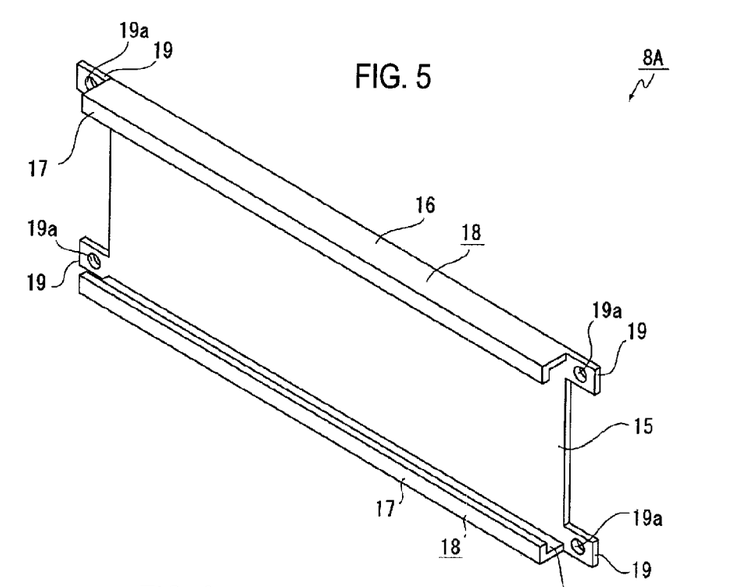
FIG. 5 is a perspective view showing a separate frame.

In the above description, an example of the frame 8 has been illustrated where the holding portions 18, 18, . . . are formed in the up-down direction and the left-right direction. However, for example, as shown in FIG. 5, a frame 8A may be used where the number of the holding portions 18 is smaller than that of the frame 8, in place of the frame 8. In the frame 8A, for example, the holding portions 18, 18 may be provided only in the up-down direction. In the frame 8A, the coupling protrusions 19, 19, . . . are protruded laterally from each of both left and right side edges of the base surface portion 15 and spaced apart from each other in the up-down direction. Here, the coupling protrusions 19, 19, . . . may be protruded rearward from the base surface portion 15.

Since the frame 8A is provided with the holding portions 18, 18 only in the up-down direction, the structure of the frame 8A is simple. Accordingly, when the frame 8A is used, it is possible to reduce the cost of manufacturing the vehicle lamp 1. Further, when the frame 8A is used, the transparent cover 14 and the planar light emitting bodies 7, 7 can be mounted to the frame 8A by being slid in the left-right direction. Accordingly, it is possible to simplify a process of mounting the lamp unit 6.

In the lamp chamber 5, a frame-shaped extension 20 is arranged between the cover 3 and the lamp unit 6. The extension 20 causes the holding portions 18, 18, . . . of the frame 8 to be shielded, so that the holding portions 18, 18, . . . are hardly visible from the outside of the vehicle lamp 1.

Hereinafter, a modified example of the lamp unit 6 is described (see FIG. 6 and FIG. 7).

Figure 6:
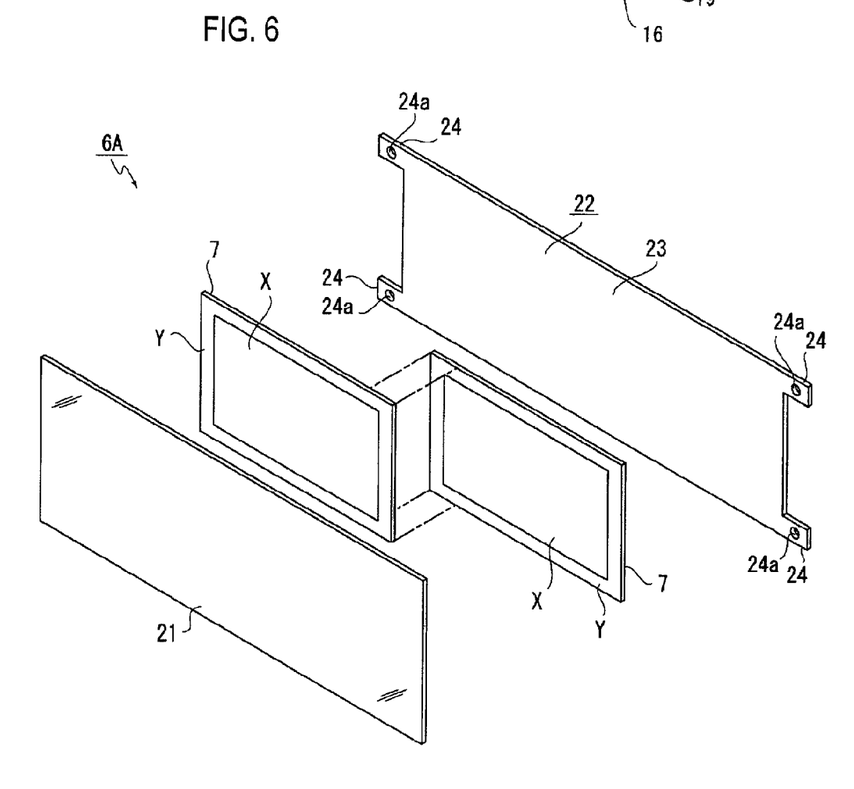
FIG. 6 is an exploded perspective view showing a lamp unit according to a first modified example.

First, a lamp unit 6A according to a first modified example is described (see FIG. 6).

The lamp unit 6A described below is different from the lamp unit 6 described above only in that another member is used in place of the frame and the transparent cover, respectively. Accordingly, only the parts different from those of the lamp unit 6 will be described in detail. Other parts similar to those of the lamp unit 6 are denoted by the same reference numerals and a description thereof is omitted.

The lamp unit 6A is configured in such a way the planar light emitting bodies 7, 7 are sealed by a first sealing film 21 and a second sealing firm 22, which are used in place of the transparent cover 14 and the frame 8, respectively.

The first sealing film 21 located at a front side is formed to be transparent and has a horizontally long rectangular shape. The second sealing film 22 includes a sealing surface portion 23 and coupling protrusions 24, 24, . . . protruding laterally from the sealing surface portion 23, respectively. The coupling protrusions 24, 24, . . . are spaced apart in the up-down direction. The sealing surface portion 23 has the same shape and size as the first sealing film 21. The coupling protrusions 24, 24, . . . are formed with screw fastening holes 24a, 24a, . . . penetrating therethrough in the front-rear direction.

The planar light emitting bodies 7, 7 are held by being sealed by the first sealing film 21 and the sealing surface portion 23 of the second sealing film 22 from the front and back. The planar light emitting bodies 7, 7 are sealed by the first sealing film 21 and the sealing surface portion 23 of the second sealing film 22, so that the lamp unit 6A is configured.

The mounting screws 100, 100, . . . are respectively inserted through the screw fastening holes 24a, 24a, . . . of the coupling protrusions 24, 24, . . . in the second sealing film 22, so that the lamp unit 6A is mounted to the lamp housing 2.

In this way, in the vehicle lamp 1, the coupling protrusions 24, 24, . . . are provided in the second sealing film 22. Accordingly, it is possible to easily mount the lamp unit 6A to the lamp housing 2.

As described above, the planar light emitting bodies 7, 7 where one ends thereof are superimposed to each other are held by being sealed by the first sealing film 21 and the second sealing film 22. Accordingly, there is no need to hold each of the planar light emitting bodies 7, 7 in a separate manner. As a result, it is possible to achieve the reduction in the number of parts and the simplification of the structure.

Further, since the planar light emitting bodies 7, 7 where one ends thereof are superimposed to each other are held by the first sealing film 21 and the second sealing film 22, the warpage or separation of the superimposed portions of the planar light emitting bodies 7, 7 is prevented. As a result, the bonding of the superimposed portions by the double-sided tape 13 or the adhesive can be omitted.

Therefore, the bonding by the double-sided tape 13 or the adhesive can be omitted, so that it is possible to simplify a process of mounting the lamp unit 6A. In addition, since the double-sided tape 13 or the adhesive is not required, material cost is saved. As a result, it is possible to reduce the cost of manufacturing the vehicle lamp 1.

Meanwhile, in the lamp unit 6A, wirings (not shown) that are connected to the auxiliary electrodes 11, 11, . . . of the planar light emitting bodies 7, 7 are drawn from the second sealing film 22 side and connected to the planar light emitting bodies 7, 7. The wirings are connected to a power supply circuit (control circuit; not shown).

Figure 7:
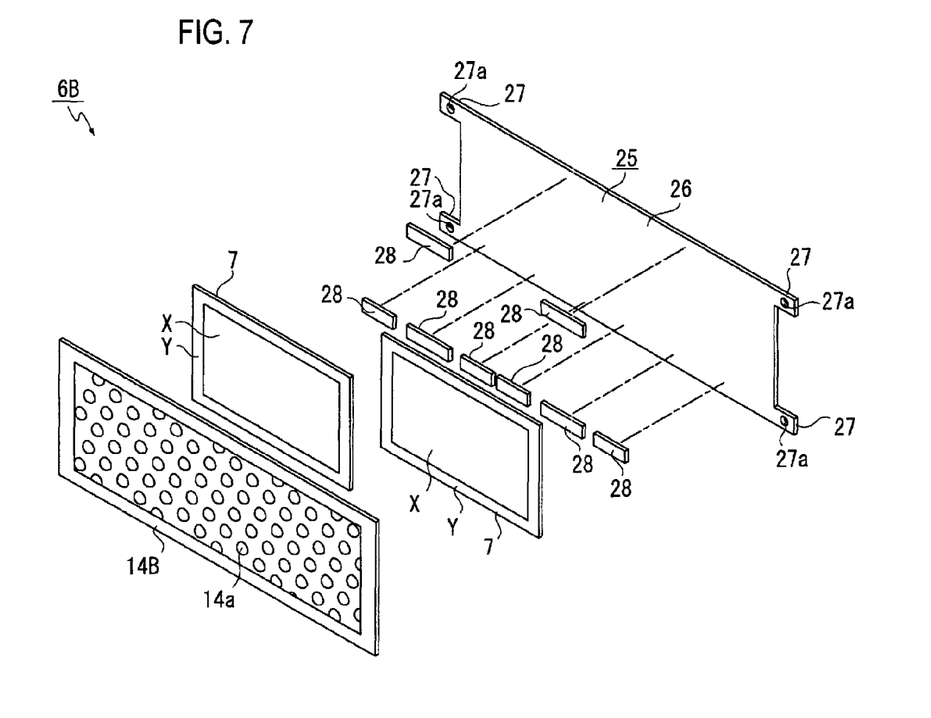
FIG. 7 is an exploded perspective view showing a lamp unit according to a second modified example.

Next, a lamp unit 6B according to a second modified example is described (see FIG. 7).

Meanwhile, the lamp unit 6B described below is different from the lamp unit 6 described above only in that another member is used in place of the frame and the configuration of the transparent cover is different. Accordingly, only the parts different from those of the lamp unit 6 will be described in detail. Other parts similar to those of the lamp unit 6 are denoted by the same reference numerals and a description thereof is omitted.

The lamp unit 6B is configured in such a way that the planar light emitting bodies 7, 7 are sealed by a transparent cover 14B used in place of the transparent cover 14 and a flexible printed wiring board 25 used in place of the frame 8.

The transparent cover 14B has a horizontally long rectangular shape. A microlens array 14a is formed at a portion other than an outer peripheral portion of the transparent cover 14B. Since the microlens array 14a is formed in the transparent cover 14B, an amount of the light that is emitted from the light emitting layers 10, 10 of the planar light emitting bodies 7, 7 and transmitted forward is increased. As a result, it is possible to improve the light extraction efficiency.

In the case of employing the configuration to improve the light extraction efficiency, in place of the microlens array 14a, a lens step having other configurations and the like may be formed in the transparent cover.

Further, the microlens array 14 or the lens step having other configurations and the like may be also formed in the transparent cover 14 of the lamp unit 6 described above.

The flexible printed wiring board 25 includes a holding surface portion 26 and coupling protrusions 27, 27, . . . . A wiring circuit (not shown) is formed on a front surface of the holding surface portion 26. The coupling protrusions 27, 27, . . . protrude laterally from the holding surface portion 26, respectively. The coupling protrusions 27, 27, . . . are spaced apart in the up-down direction. The holding surface portion 26 has the same shape and size as the transparent cover 14B. The coupling protrusions 27, 27, . . . are formed with screw fastening holes 27a, 27a, . . . penetrating therethrough in the front-rear direction.

Anisotropic conductive films 28, 28, . . . are bonded to the wiring circuit of the holding surface portion 26. The wiring circuit of the holding surface portion 26 is connected to a power supply circuit (control circuit) through a connection line (not shown).

In a state where the planar light emitting bodies 7, 7 are covered by the transparent cover 14B from the front, an outer peripheral portion of the transparent cover 14B is bonded to the holding surface portion 26 by, for example, adhesion or the like. In this way, the planar light emitting bodies 7, 7 are disposed and held in the flexible printed wiring board 25. As the planar light emitting bodies 7, 7 are held in the flexible printed wiring board 25, the lamp unit 6B is configured. In a state where the planar light emitting bodies 7, 7 are held in the flexible printed wiring board 25, the anisotropic conductive films 28, 28, . . . are connected to the auxiliary electrodes 11, 11, . . . of the planar light emitting bodies 7, 7, respectively. Power is supplied to the auxiliary electrodes 11, 11, . . . of the planar light emitting bodies 7, 7 through the wiring circuit of the flexible printed wiring board 25 and the anisotropic conductive films 28, 28, . . . .

The mounting screws 100, 100, . . . are respectively inserted through the screw fastening holes 27a, 27a, . . . of the coupling protrusions 27, 27, . . . in the flexible printed wiring board 25, so that the lamp unit 6B is mounted to the lamp housing 2.

In this way, in the vehicle lamp 1, the coupling protrusions 27, 27, ... are provided in the flexible printed wiring board 25. Accordingly, it is possible to easily mount the lamp unit 6B to the lamp housing 2.

As described above, the planar light emitting bodies 7, 7 where one ends thereof are superimposed to each other are held in the flexible printed wiring board 25 and power is supplied to the planar light emitting bodies 7, 7 through the anisotropic conductive films 28, 28, ... from the wiring circuit. In this way, the flexible printed wiring board 25 has a function of holding the planar light emitting bodies 7, 7 and a function of supplying power to the planar light emitting bodies 7, 7. Therefore, it is possible to achieve the simplification of the structure by the reduction in the number of parts.

Further, since the planar light emitting bodies 7, 7 are held in a state of being covered by the transparent cover 14B, the warpage or separation of the superimposed portions of the planar light emitting bodies 7, 7 is prevented, so that it can be omitted to bond the superimposed portions by the double-sided tape 13 or the adhesive.

Therefore, the bonding of the superimposed portions by the double-sided tape 13 or the adhesive can be omitted, so that it is possible to simplify a process of mounting the lamp unit 6B. In addition, since the double-sided tape 13 or the adhesive is not required, material cost is saved. As a result, it is possible to reduce the cost of manufacturing the vehicle lamp 1.

Meanwhile, since power is supplied to the planar light emitting bodies 7, 7 by using the anisotropic conductive films 28, 28, ..., it is not necessary to perform a soldering work having a high temperature. Accordingly, problems such as a decrease in the function of the planar light emitting bodies 7, 7 due to the influence of heat do not occur. As a result, it is possible to secure a good function of the planar light emitting bodies 7, 7.

Further, since the flexible printed wiring board 25 is used as a member of holding the planar light emitting bodies 7, 7, the planar light emitting bodies 7, 7 have, as a whole, a curved shape so as to follow the shape of the flexible printed wiring board 25. Accordingly, the light emitted from the light emitting layers 10, 10 can be irradiated toward a desired direction and the lamp unit 6B can be arranged in accordance with an arrangement space of the lamp chamber 5. As a result, it is possible to improve a degree of freedom in design.

Meanwhile, in the lamp unit 6B, as a member of holding the planar light emitting bodies 7, 7, a flat rigid circuit board formed of Bakelite, glass epoxy or alumina or the like may be used, in place of the flexible printed wiring board 25.

As described above, in the vehicle lamp 1, the transparent portion of the non-light emitting region Y of one planar light emitting body 7 and the outer end portion of the light emitting region X of the other planar light emitting body 7 are superimposed to each other in the thickness direction of the planar light emitting bodies 7, 7.

Therefore, the light emitted from the light emitting region X superimposed to the transparent non-light emitting region Y is irradiated through the non-light emitting region Y superimposed. As a result, occurrence of dark portions in the light emitting range can be suppressed, so that it is possible to reduce the generation of light unevenness.

Further, since the occurrence of dark portions in the light emitting range is prevented, it is possible to secure visibility similar to the case where light is emitted from a single large panel, in a state where a plurality of planar light emitting bodies 7, 7, ... are arranged side by side.

Figure 8:
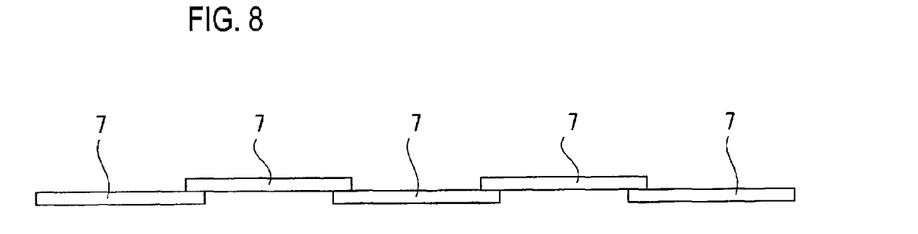
FIG. 8 is a conceptual view showing an arrangement example of a plurality of planar light emitting bodies.

Meanwhile, in the above description, an example has been illustrated where portions of two planar light emitting bodies 7, 7 are superimposed to each other. However, for example, in the case where portions of three or more planar light emitting bodies 7, 7, ... are superimposed to each other, it is desirable that adjacent planar light emitting bodies 7, 7, ... are arranged so as to be alternately located in order front and back, as shown in FIG. 8. When adjacent planar light emitting bodies 7, 7, ... are arranged so as to be alternately located in order front and back in this way, the overall thickness of the planar light emitting bodies 7, 7, ... can be as thin as possible. As a result, it is possible to reduce the thickness of the vehicle lamp 1.

Further, in the above description, an example has been illustrated where the planar light emitting bodies 7, 7, ... are arranged side by side in the left-right direction. However, the planar light emitting bodies 7, 7, ... may be arranged side by side in the up-down direction in a state where portions thereof are superimposed to each other. Also, the planar light emitting bodies 7, 7, ... may be arranged side by side in the up-down direction and in the left-right direction in a state where portions thereof are superimposed to each other.

What is claimed is:

1. A vehicle lamp comprising:
a lamp housing having an opening at least at one side and a cover attached to the lamp housing and closing the opening to form a lamp chamber; and
a lamp unit disposed in an interior of the lamp chamber and including a light source having a plurality of planar light emitting bodies,
wherein an outer peripheral portion of each of the planar light emitting bodies is a non-light emitting region, and a portion inside the non-light emitting region of each of the planar light emitting bodies is a light emitting region,
at least a portion of the non-light emitting region is formed to be transparent, and
the transparent portion of the non-light emitting region of the planar light emitting bodies and an outer end portion of the light emitting region of other planar light emitting bodies are superimposed to each other in a thickness direction of the planar light emitting bodies.

2. The vehicle lamp according to claim 1, wherein the plurality of planar light emitting bodies is held in a frame.

3. The vehicle lamp according to claim 2, wherein at least a portion of an outer peripheral portion of the frame is folded-back relative to other portions thereof and provided as a holding portion configured to hold the outer end portion of the plurality of planar light emitting bodies, and
wirings are arranged in the interior of the holding portion and adapted to supply power to the plurality of planar light emitting bodies.

4. The vehicle lamp according to claim 1, wherein the plurality of planar light emitting bodies is sealed by a sealing film.

5. The vehicle lamp according to claim 1, further comprising:
a flexible printed wiring board is provided on which the plurality of planar light emitting bodies is arranged,
wherein a wiring circuit of the flexible printed wiring board is located to face the plurality of planar light emitting bodies,
an anisotropic conductive film is bonded to the wiring circuit, and power is supplied to the plurality of planar light emitting bodies through the anisotropic conductive film from the wiring circuit.

* * * * *